United States Patent
McCall et al.

(10) Patent No.: US 6,305,440 B1
(45) Date of Patent: Oct. 23, 2001

(54) DISPENSER WITH RADIO FREQUENCY ON-BOARD VAPOR RECOVERY IDENTIFICATION

(75) Inventors: Don C. McCall, Cedar Park, TX (US); Ken W. Taylor, Oak Ridge, NC (US)

(73) Assignee: Dresser, Inc., Addison, TX (US)

( * ) Notice: Subject to any disclaimer, the term of this patent is extended or adjusted under 35 U.S.C. 154(b) by 0 days.

(21) Appl. No.: 09/646,237

(22) PCT Filed: Feb. 23, 1999

(86) PCT No.: PCT/US99/04205

§ 371 Date: Sep. 11, 2000

§ 102(e) Date: Sep. 11, 2000

(87) PCT Pub. No.: WO99/46200

PCT Pub. Date: Sep. 16, 1999

Related U.S. Application Data (60) Provisional application No. 60/077,801, filed on Mar. 12, 1998.

(51) Int. Cl.[7] .............................. B65B 31/00; B67C 3/00
(52) U.S. Cl. .................................. 141/7; 141/4; 141/59; 141/94; 141/98; 141/351; 340/5.61; 340/5.64
(58) Field of Search .................. 141/4, 5, 7, 59, 141/94, 98, 219, 351, 360, 361; 340/5.61, 5.64

(56) References Cited

U.S. PATENT DOCUMENTS

| | | |
|---|---|---|
| 5,605,182 | 2/1997 | Oberrecht et al. . |
| 5,862,222 | 1/1999 | Gunnarsson . |
| 5,956,259 | 9/1999 | Hartsell, Jr. et al. . |

*Primary Examiner*—Timothy L. Maust
(74) *Attorney, Agent, or Firm*—Jenkens & Gilchrist, P.C.

(57) ABSTRACT

A dispensing system (10) that utilizes radio frequencies identification capabilities in a service station environment to reliably and accurately detect an on-board vapor recovery (ORVR) system in a vehicle (26). The dispensing system (10) includes a vapor recovery system (33) for recovering fuel vapors responsive to a fuel being dispensed. The vapor recovery system (33) has a disabling mechanism (42) for selectively preventing its operation. The dispensing system (10) also includes an antenna (22A, 22B, 24A, 24B) for detecting a radio frequency signal from a transmitter (23 or 25) in a vehicle (26). The radio frequency signal may be a single bit indicating that the vehicle (26) has the ORVR system, or may include additional bits indicating a type of fuel to be dispensed. When the transmitter (23 or 25) is within a predetermined distance from the antenna (22A, 22B, 24A, 24B), a controller (20) receives the radio frequency signal from the antenna (22A, 22B, 24A, 24B) and asserts a disable signal (41). The disabling mechanism, responsive to the asserted disable signal (41), prevents the vapor recovery system (33) from operating and thereby eliminates any unwanted accumulation of air.

4 Claims, 5 Drawing Sheets

DISPENSER WITH RADIO FREQUENCY ON-BOARD VAPOR RECOVERY IDENTIFICATION

CROSS-REFERENCE TO RELATED APPLICATION

This application claims the benefit of copending U.S. provisional application Ser. No. 60/077,801 filed Mar. 12, 1998.

BACKGROUND OF THE INVENTION

The present invention relates to dispensers and, more particularly, to fuel dispensers that use radio frequency identification technology to automatically identify the presence of an on-board vapor recovery system in a receptacle (e.g. a vehicle) with little or no customer interaction.

Many fuels, by their very nature, are hazardous materials that require extreme care in handling and dispensing. For example, when dispensing gasoline into a vehicle's fuel tank, a significant quantity of gas vapor is typically released into the surrounding atmosphere. For obvious reasons, it is undesirable to have gasoline vapors floating around the atmosphere. Therefore, state and federal environmental air quality regulations require that retail fuel dispensers in certain urban areas have a system for recovering the gasoline vapors. These systems typically include a small vacuum pump that pulls the vapor from around the dispenser's nozzle during fueling and pumps the vapor into a holding tank. Each system monitors the amount of fuel dispensed and collects a quantity of vapor in proportion thereto.

Additional regulations have required automobile manufactures to add a carbon canister system to new vehicles. The carbon canister system, or on-board vapor recovery (ORVR) system, collects the vapors during fueling. As a result, new vehicles will have their own vapor recovery systems and old vehicles will not; fuel dispensers located in urban areas will have their own vapor recovery systems while other fuel dispenser will not. Therefore, two different types of vapor recovery systems exist, neither system being in 100% use throughout the United States.

A problem occurs when a vehicle with an ORVR system is receiving fuel from a dispenser with a vapor recovery system. In this situation, the dispenser's vapor recovery system recovers air with very little gasoline vapor. Because this air is collected through the same nozzle, piping and underground storage tank in which gasoline vapors are normally recovered, the air can mix with the vapors from other fuelings and create an undesirable condition.

One proposed solution is to provide each dispenser with a specialized nozzle that detects the presence of the ORVR system. Additionally, a vehicle with the ORVR system is to be outfitted with a complimentary device that registers with the nozzle. When engaged, the specialized nozzle signals the dispenser's vapor recovery system to turn off. However, this solution has several drawbacks. For one, this solution is rather complicated for the customer and therefore often will not activate properly, or worse, damage the system and/or vehicle. For another, because of the mechanical nature of this solution, it requires maintenance and supervision to ensure its continuing performance.

What is needed, therefore, is a system and method that reliably and accurately identifies a vehicle with an ORVR system and disables the vapor recovery system of a corresponding fuel dispenser accordingly. Furthermore, the system must be operated in an environment having multiple dispensers within close proximity to each other.

SUMMARY OF THE INVENTION

A dispensing system and method of the present invention, accordingly, utilizes radio frequency identification capabilities in a service station environment to reliably and accurately detect an on-board vapor recovery system in a vehicle.

To this end, the dispensing system of the present invention includes a vapor recovery system for recovering fuel vapors responsive to a fuel being dispensed. The vapor recovery system has a disabling mechanism for selectively preventing its operation. The dispensing system also includes an antenna for detecting a radio frequency signal from a transmitter in a vehicle. The transmitter, and hence the radio frequency signal, serve to indicate that the vehicle has an ORVR system. When the transmitter is within a predetermined distance from the antenna, a controller receives the radio frequency signal from the antenna and asserts a disable signal. The disabling mechanism, responsive to the asserted disable signal, prevents the vapor recovery system from operating and thereby eliminates any unwanted accumulation of air.

The present invention overcomes the above-noted problems with the prior art by providing a reliable, customer-friendly identification system that can automatically identify an on-board vapor recovery system on a vehicle, and disable the dispenser's vapor recovery system accordingly. The system of the present invention interfaces smoothly with existing service station systems to provide seemingly transparent operation.

DETAILED DESCRIPTION OF THE PREFERRED EMBODIMENT

Figure 1:
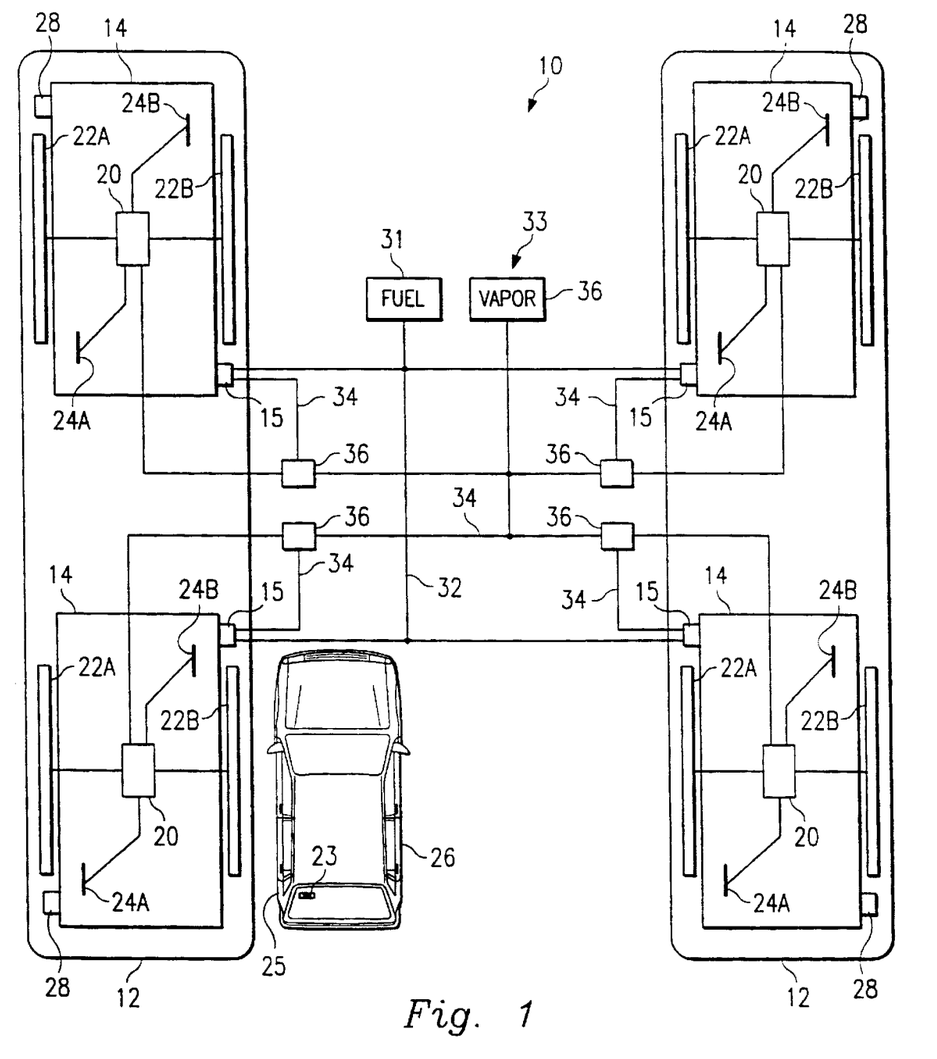
FIG. 1 is a schematic block diagram illustrating an overhead view of a service station equipped with an embodiment of the identification system of the present invention.

In FIG. 1, the reference numeral 10 refers to a dispenser system embodying features of the present invention. The system 10 electronically identifies a receptacle (e.g., a vehicle) having a transmitter and disables a dispenser-related process accordingly. For example, the system 10 allows customers to drive their vehicle directly up to a fuel dispenser and immediately begin pumping fuel, while at the same time limiting the undesired accumulation of air by the dispenser's vapor recovery system.

The Dispensers

In one embodiment (FIG. 1), the system 10 is implemented in a service station environment that includes two service islands 12, each having two dispensers or fuel pumps 14, it being understood that the number of islands and pumps, as well as their geometry and relationship to one another, may vary according to the requirements of the environment. All of the dispensers 14 provide a dispensing area on each of the opposing sides of the dispenser, each of which include at least one fuel nozzle 15 and a customer activated terminal (not shown) for performing traditional dispensing functions as well as the functions to be described in detail below.

It is understood that the illustration is not necessarily drawn to scale. In a typical service station, the width of the dispensers 14 is approximately 4 feet. Furthermore, the distance between the dispensers 14 on a single island 12 is approximately 8 feet, and the distance between facing dispensers 14 of adjacent islands 12 is approximately 20 feet. Each fuel dispenser 14 has two separate dispensing areas, one on each side of the dispenser 14, where the fuel nozzles are located. Each dispensing area typically also has a customer activated terminal ("CAT") that a customer uses to make various selections. Other possible arrangements of the system 10 include environments with more than two service islands, not necessarily parallel to one another, or arrangements in which the islands form a circle with inner and outer rows or islands.

Radio frequency receivers 20 are included with each of the dispensers 12. Connected to each receiver 20, and mounted to each fuel dispenser 14, are one or more antennas. For example, two (2) overhead antennas 22A, 22B are mounted to the top of the dispenser 14 (on each opposing side thereof) for detecting high-mounted ORVR transmitters 23 and two (2) antennas 24A, 24B are mounted inside the head of the dispenser 14, one on each side of the dispenser, for detecting low-mounted ORVR transmitters 25. As discussed in detail below, each receiver 20 reads ORVR identification (ORVR-ID) data detected by the antennas 22A, 22B, 24A, 24B from the transmitters 23 or 25. Each receiver 20 also includes an amount of control logic (hereinafter receiver/controller) that in alternative embodiments, may be separated out into one or more discrete components. It is contemplated that a vehicle 26 entering a dispensing area in front of one of the fuel dispensers 14 will include a transmitter 23 mounted thereto such that the antennas 22B, 24B (as shown in FIG. 1) on the dispenser 14 nearest the vehicle will read the ORVR-ID data contained in the transmitter.

Figure 2:
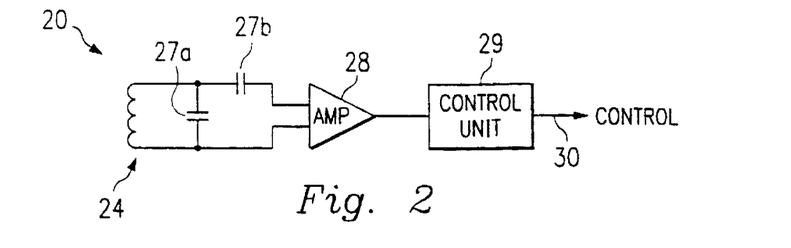
FIG. 2 is a simplified schematic of a receiver for use with the system of FIG. 1.

Referring also to FIG. 2, functionality of the receiver/controller 20 may be illustrated by a simplified schematic of the antenna 24, a pair of capacitors 27a, 27b, an amplifier 28 and a control unit 29. The antenna 24 is illustrated by a single lead coil parallely connected to the capacitor 27a and serially connected to the capacitor 27b. It is anticipated that different types or configurations of coils may be used, such as a coil wrapped around a ferrite rod to reduce the size requirement of the coil. The capacitors 27a, 27b serve to tune the receiver 20 to a particular frequency. The antenna 24 drives the tuned signal to the amplifier 28, which may also include one or more active filters. The output of the amplifier 28 is then provided to the control unit 29, which drives a CONTROL signal 30 accordingly.

Figure 3:
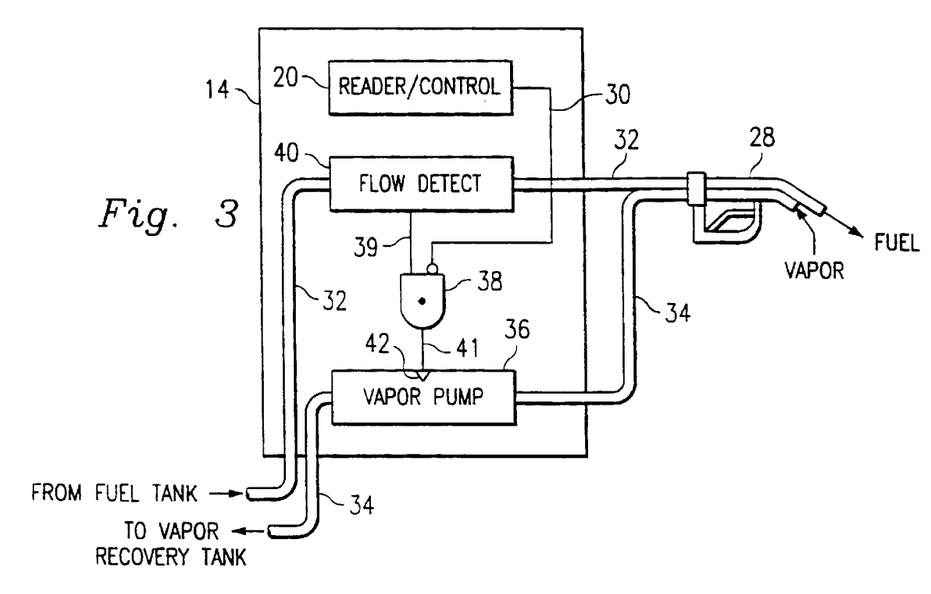
FIG. 3 is a simplified diagram of a dispenser used with the system of FIG. 1.

Referring also to FIG. 3, each of the nozzles 15 is connected to one or more fuel tanks 31 through one or more fuel pipes 32. The nozzles 15, fuel tanks 31, and fuel pipes 32 operate in a normal, conventional manner and will therefore not be further discussed. Surrounding each nozzle is a vapor recovery system 33. The vapor recovery system includes a vapor pipe 34 which is connected to a vapor recovery tank 36. The vapor recovery tank 36 exerts a negative pressure (as compared to normal atmospheric pressure) so that when the nozzle 15 is dispensing fuel, the vapor recovery pipe 34 collects a quantity of vapor in proportion to the amount of fuel dispensed. For the sake of clarity, the fuel pipes 32 and vapor pipes 34 servicing some of the nozzles 15 are not shown in FIG. 1.

Imposed in the pipe 34 are a plurality of vapor pumps 36 associated with each nozzle 15. The vapor pump 36 is positioned in the pipe 34 so that each pump controls a single nozzle. Although not shown, in an alternative embodiment, a single multi-path vapor pump may simultaneously control multiple nozzles. In these embodiments, simple open/shut flow valves may be associated with each nozzle 15. The vapor pumps 36 (or the open/shut flow valves) operate between an "off" (no-flow) or "on" (flow-through) state responsive to the corresponding receiver/controller 20.

A positive-logic AND gate 38 illustrates the basic enable/disable functionality for the vapor pump 36. The AND gate 38 receives the CTRL signal 30 (inverted) from the receiver/controller 20 and a FLOW signal 39 from a flow detector 40 in the fuel pipe 32 to produce a DISABLE signal 41. The DISABLE signal 41 operates a disable mechanism (e.g., an off control) 42 to control whether or not the vapor pump 36 may operate. In the present illustration, the inputs and output of the AND gate 38 operate as described in Table 1, below. It is understood, however, that the AND gate 38 is meant as a functional illustration and different techniques are anticipated for controlling the vapor pump 36 operation.

TABLE 1

| ORVR detected (CTRL Signal 30) | Fuel Dispensing (FLOW Signal 39) | Pump 36 Disabled (DISABLE signal 41) |
| --- | --- | --- |
| TRUE | FALSE | TRUE |
| TRUE | TRUE | TRUE |
| FALSE | TRUE | FALSE |
| FALSE | FALSE | TRUE |

Figure 4A:
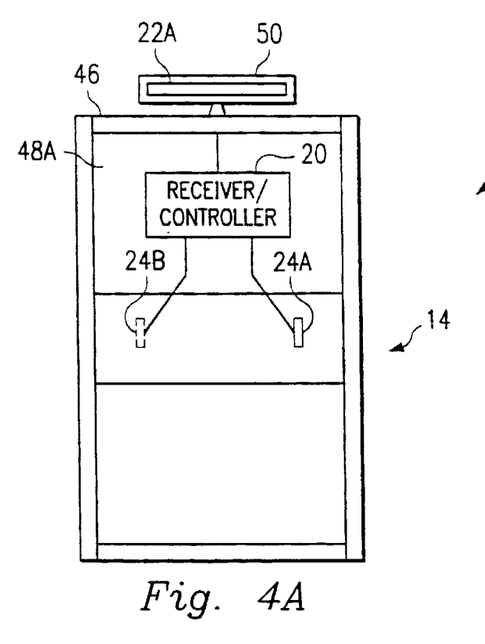
FIG. 4A is a side view of a dispenser used with the system of FIG. 1.
Figure 4B:
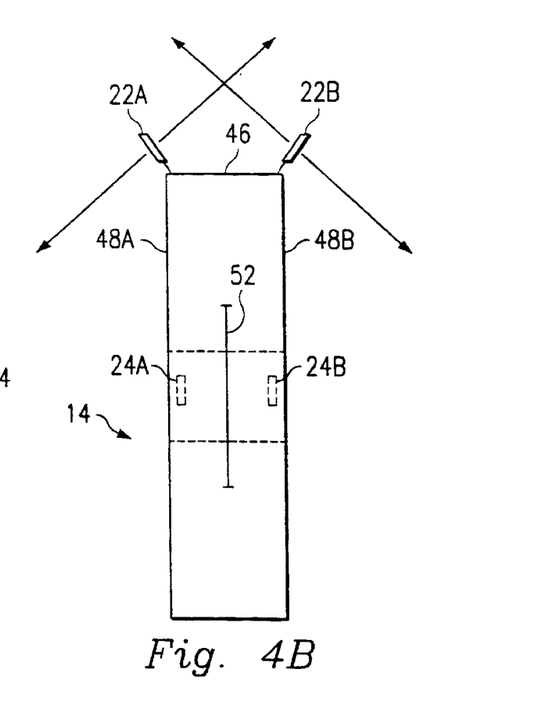
FIG. 4B is an end view of the dispenser of FIG. 4A.

FIGS. 4A and 4B illustrate a possible arrangement of the antennas on the dispensers. In this embodiment, the antennas 22A, 22B are mounted to a top 46 of the dispenser 14 and extend outwardly from sides 48A, 48B of the dispenser 14. In one embodiment, the antennas 22A, 22B extend in parallel (FIG. 4A) with the dispenser 14, while in another embodiment they extend at an upward angle (FIG. 4B). The antennas 22A, 22B transmit electromagnetic fields in a direction perpendicular to the plane of the antenna. In the embodiment of FIG. 4A, metallic material 50 prevents the electromagnetic fields from reaching the opposite side of the dispenser 14. In the embodiment of FIG. 4B, due to the upward angle of the antennas 22A, 22B, the electromagnetic fields are directed from one side of the antenna downwards toward the fueling side of the dispenser 14, while the electromagnetic fields from the other side of the antenna are directed up and away from the opposite side of the dispenser. These arrangements not only reduce problems associated with reading a transmitter 23, 25 located on the far side of the vehicle, but also eliminate interference from vehicles at other fueling areas of adjacent service islands 12.

The antennas 24A, 24B are preferably mounted within the dispenser 14. One antenna 24A or 24B is positioned on either side 48A or 48B, respectively, of the dispenser 14 as shown. Metallic material 52 inside the dispenser 14 helps prevent the reading of transmitters from the wrong side of the dispenser.

In one embodiment, only one overhead antenna (22A or 22B) is provided on each side of the dispenser 14. Other embodiments may use the two lower-mounted antennas 24A, 24B instead of, or in addition to, the overhead antennas 22A, 22B.

Although not shown, certain embodiments may include an over-ride switch to allow an attendant or a customer to control operation of the vapor pump 36. Also, additional embodiments may require a power pulse to be generated by the dispensers 14 to activate the transmitters 23, 25 into producing the ORVR-ID data. Although these additional embodiments are slightly more sophisticated and expensive, they can be synchronized so that false readings are reduced or eliminated. These embodiments are discussed in greater detail with respect to the power-pulse scheme, below.

The Transmitters

Referring again to FIG. 1, the transmitters 23, 25 are radio frequency identification tags that are mounted to the vehicle 26. The transmitters 23, 25 contain ORVR identification (ORVR-ID) data that is broadcast in response to various conditions. In one embodiment, the ORVR-ID data is broadcast after the transmitters 23, 25 receive a predetermined radio frequency ("RF") wave (i.e., a power pulse). The RF wave is sent by the receiver/controller 20 housed in one or more of the dispensers 14. This embodiment is discussed in greater detail with respect to the power-pulse scheme, below.

In another embodiment, the transmitters 23, 25 transmit the ORVR-ID data by their own initiative or as dictated by the vehicle 26. For example, the transmitters can continuously transmit, at certain intervals, the ORVR-ID data. Also, the transmitters may transmit in response to specific conditions or to predetermined times, such as when the vehicle is stationary and the engine is running plus a period of time (e.g. 30 minutes) after the engine stops running. Further, the transmitters may transmit in response to a fuel door (FIG. 5) on the vehicle 26 being opened.

The ORVR-ID data includes a single bit, with a "high" state representing the existence of the transmitter 23, 25 and hence the on-board ORVR. If no transmitter is within range, no response signal 92 will exist, representing an electrical "low" state (not shown). The ORVR-ID data may also include additional bits that represent, for example, a type of fuel required by, or acceptable to, the vehicle 26.

Figure 5:
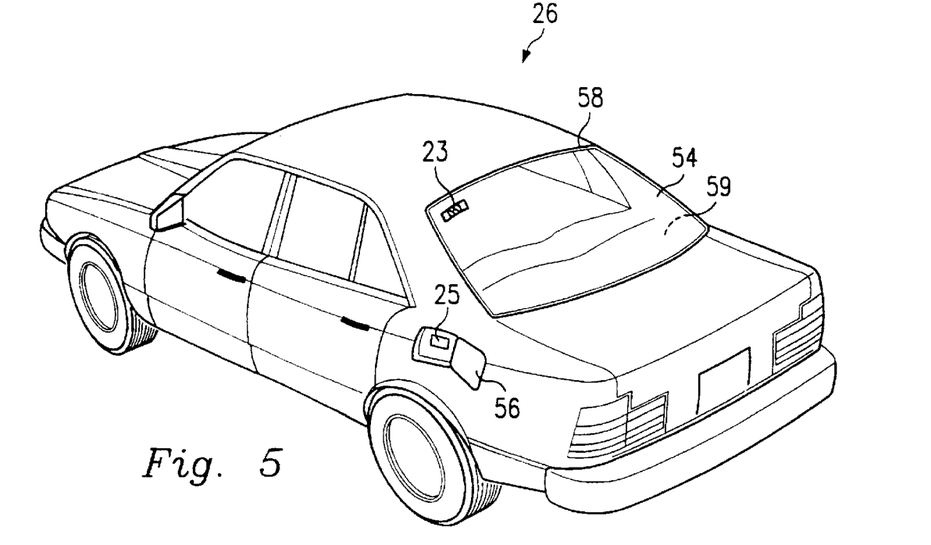
FIG. 5 is a partial rear perspective view of the back end of a vehicle illustrating the placement of high and low vehicle-mounted transmitters used with the system of FIG. 1.

Referring to FIG. 5, the high-mounted transmitter 23 may be mounted to a rear window 54 of the vehicle 26 near the side of the vehicle where a fuel door 56 is located. Preferably, the high-mounted transmitter 23 has a coil (not shown) located on each side of the vehicle. Other possible locations for the high-mounted transmitter 23 include inside a head liner 58 of the vehicle 26 or on a package shelf 59.

The low-mounted transmitter 25 may be mounted under the vehicle 26 or inside the fuel door 56. It is understood, that most vehicles will only have one transmitter 23, 25, which may be mounted in other locations, depending upon various factors such as transmitter strength and the particular arrangement of the different antennas. Furthermore, the transmitter 23 or 25 may be incorporated into the vehicle 26, thereby making it seemingly invisible to the vehicle's owner.

Figure 6:
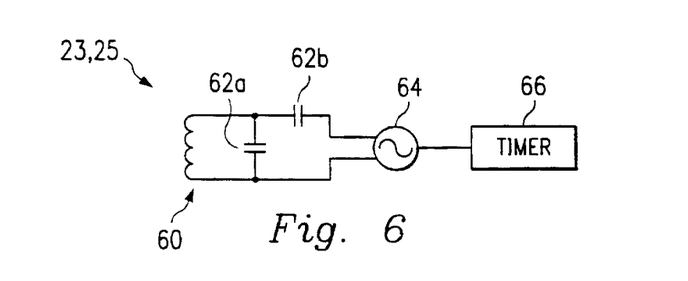
FIG. 6 is a simplified schematic of a transmitter for use with the system of FIG. 1.

Referring to FIG. 6, functionality of the transmitters 23, 25 may be illustrated by a coil of wire 60, a pair of capacitors 62a, 62b, an oscillator 64 and potentially, a timer 66. The coil 60 may be wrapped around a ferrite rod (not shown) and is tuned by the capacitors 62a, 62b. The coil 60 is activated by the oscillator 64, which is turned on and off by the timer 66. For the embodiments controlled by the vehicle 26, the oscillator 64 is controlled by a control circuit (not shown). In one embodiment, the coil 60 operates at a relatively low frequency (e.g., 125 KHz) so that it does not interfere with commercially broadcast radio signals. Alternatively, a relatively high frequency (e.g., 900 MHz) could be used.

The Power-Pulse Scheme

Several embodiments of the present invention may utilize a power-pulse scheme. The receiver/controllers 20 send out periodic, low frequency (about 134.2 kHz), power pulses to the antennas 22A, 22B, 24A, 24B. The antennas 22A, 22B, 24A, 24B in turn direct the electromagnetic fields generated by the power pulses to particular areas adjacent the dispensers. A power pulse lasts approximately 50 milliseconds (ms) and may be generated every 90 ms to 140 ms. When a transmitter 23, 25 enters the electromagnetic field, the energy is collected by the coil in the transmitter and stored in one of the capacitors. After the power pulse is completed, the transmitter 23, 25 transmits the ORVR-ID data using the energy stored in the capacitor. The antennas 22A, 22B, 24A, 24B mounted to the dispensers 14 read the ORVR-ID data broadcast from the transmitter 23 or 25 and send the data to the receiver/controllers 20 for decoding and further transmission.

Figure 7:
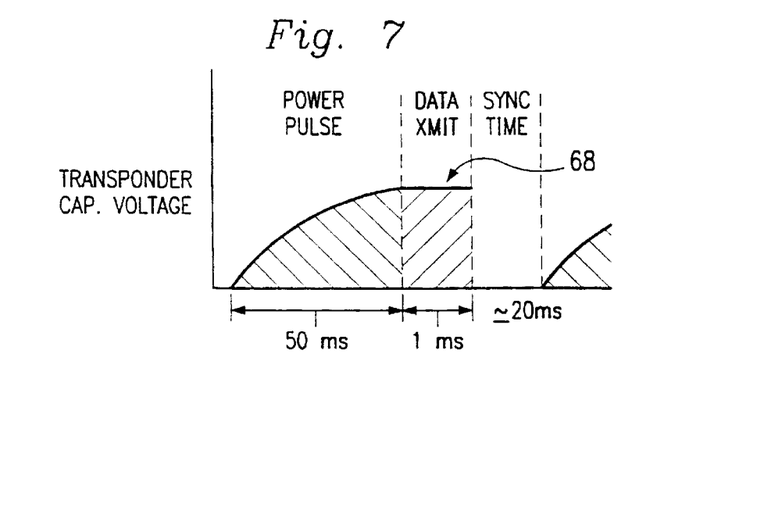
FIG. 7 is a graph plotting transmitter capacitor voltage with respect to time for a transmitter used with the system of FIG. 1.

FIG. 7 graphically illustrates the operation of a transmitter 23 or 25 in cooperation with a receiver/controller 20. Responsive to the receiver/controller 20 emitting a power pulse (typically occurring for 50 ms), the transmitter 23 or 25 (if within range) will be charged as indicated by the increase in the voltage potential of its capacitor. Once charged, the transmitter 23 or 25 then emits a response signal 68 (lasting about 1 ms) thereby sending its ORVR-ID data to the receiver/controller 20. In the present illustration, the response signal 68 represents an electrical "high" value for the ORVR-ID data.

The ORVR-ID data is then picked up by one of the antennas 22A, 22B, 24A, 24B of the receiver/controller 20. Once the data has been received data, the transmitter 23 or 25 continues to discharge its storage capacitor thereby resetting the transmitter to make it ready for the next read cycle. In one embodiment, a "sync time" period between the transmission pulses lasts for about 20 ms, depending upon the chosen criteria. The next power pulse may be transmitted approximately 20 ms to 50 ms after the transmitter 23 or 25 has completed transmitting the data. As explained further below, synchronization is used to coordinate the transmission of the power pulses through the various antennas 22A, 22B, 24A, 24B of the system 10.

Other synchronization arrangements are possible depending upon the number of pumps and their relationship to one another. In one embodiment, the synchronization does not necessarily need to occur for all antennas but instead will occur only in the case of antennas for dispensing areas that face each other where the energy fields in front of the antennas might possibly overlap. In another embodiment, a dither synchronization method may be used. In dither synchronization, the sync time changes for each dispenser. In this way, if there is ever a "collision" of data, such as data transmitted by the transmitter 25 and simultaneously received by multiple receivers 20, the next time the data is transmitted, there would not be a collision because of the unique sync times for each receiver.

According to another embodiment of the invention, it is desirable to transmit the power pulse at a low frequency to charge the capacitors in transmitters 23 and 25. The transmitters are designed to emit the response signals at a higher frequency, such as Ultra High Frequency.

Figure 8:
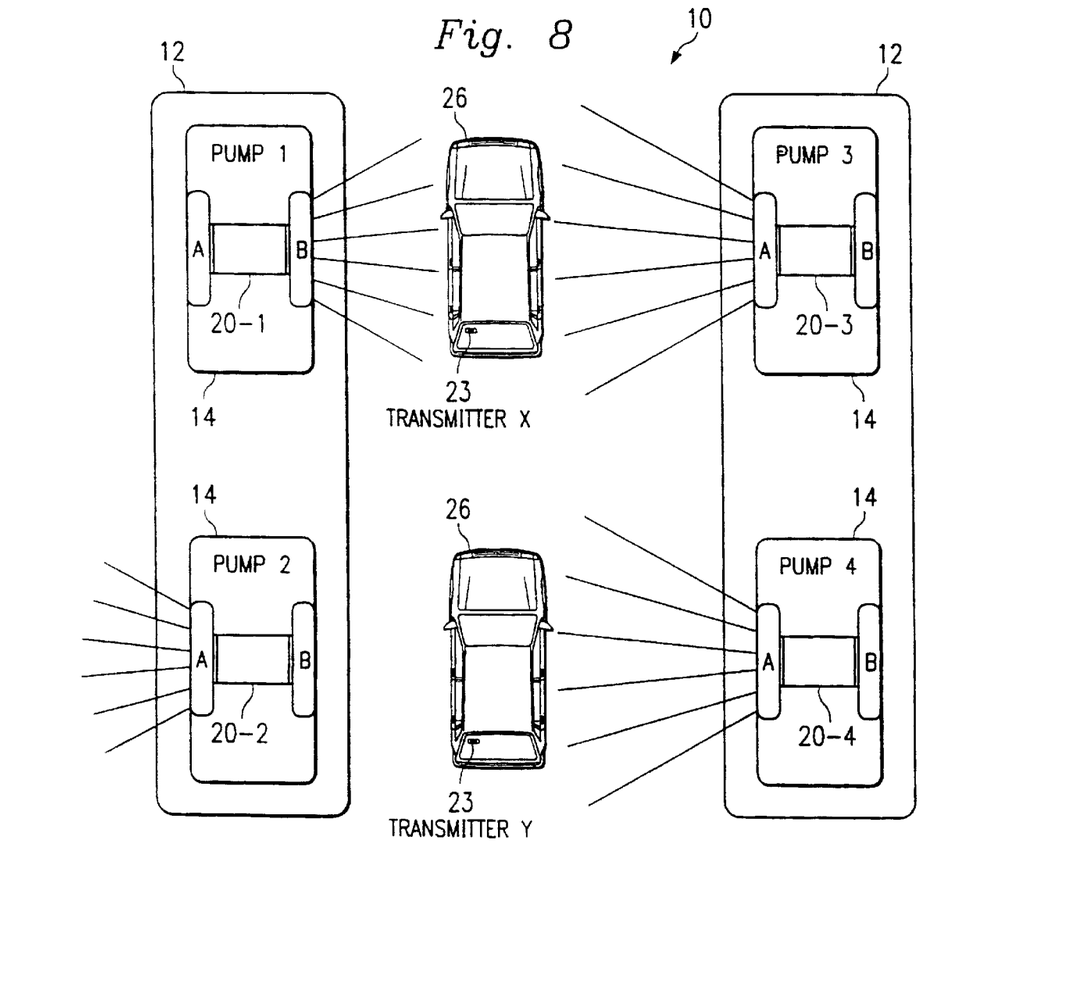
FIG. 8 is a schematic representation of a service station environment and the arrangement of dispensers therein illustrating a reader synchronization strategy for the system of FIG. 1.

FIG. 8 illustrates details concerning one type of synchronization for the receiver/controllers 20 within the system 10 to avoid crosstalk among the transmitters 23 that could result in erroneously reading an ORVR system in a vehicle that does not have one. A simplified schematic of the system 10 is shown in which the dispensers 14 are labeled as pumps 1–4 and have corresponding receiver/controllers 20-1 to 20-4, each with antennas A and B on opposite sides of the pump. To illustrate the crosstalk problem, the receiver/controllers in pumps 1 and 3 are unsynchronized thus demonstrating the potential for crosstalk caused by a transmitter X being charged by one of the receiver/controllers when the transmitter X is located between the pumps. In contrast, the receiver/controllers in pumps 2 and 4 are synchronized thus solving the crosstalk problem for a transmitter Y located between the pumps. This synchronization is provided by a common clock signal, not shown.

Pumps 1 and 3 send out power pulses from antennas B and A, respectively, thereby causing the potential for one or both of them to charge the transmitter X, even though the transmitter X is closer to pump 1. Each of the antennas B and A emitting power pulses generates an energy field extending from the antenna, as represented by lines in FIG. 8. The energy field in front of each antenna includes a "near field" region, a "far field" region, and a "transition zone" therebetween (not shown). There are no sharp dividing lines between the three regions and somewhat arbitrary limits are set for each region based upon the way in which energy spreads as the distance from the antenna increases. In one example, the near field region generally extends out from the antenna to a distance of $\lambda D^{2/A\lambda = A/}2\lambda$ where D=the diameter of the antenna, A=area of antenna aperture, and $\lambda$=wavelength. The distance of the far field region is about five times the length of the near field region and occurs at a distance of roughly 2D/22. The transition zone is the region therebetween. As shown in FIG. 8, the possibility exists for overlap of the transition zones or far field regions of the antennas B and A for pumps 1 and 3 when the antennas emit power pulses simultaneously.

Upon examination of the power pulses emitted from pumps 1 and 3, it is most likely that the Transmitter X will be charged by antenna B in pump 1 because the transmitter is relatively far from pump 3. However, it may end up being charged by the overlap of power pulses from both pumps 1 and 3 even in a situation where the transmitter is too far from either pump to be charged by antenna B or antenna A alone. This can occur when the energy in the overlapping transition zone or far field regions of the antennas, by virtue of their combined strength, is sufficiently high. Once the power pulses are completed, if the transmitter X receives sufficient energy it will transmit its data in response. Even though pump 1 is closest to the Transmitter X, it is possible that pump 3 will also receive the response, thereby resulting in crosstalk. An even worse situation could arise if two transmitters were in the center lane between pump 1 and pump 2 and the pumps 1 and 3 receive the responses from the wrong transmitters resulting in the inappropriate operation of the vapor recovery system 33 (FIG. 1).

Pumps 2 and 4 send out power pulses from their antennas A and A, respectively. Transmitter Y is too far away to be charged by the energy field generated by pump 4 alone; and it will not be charged by pump 2, because the power pulse from pump 2 is not in a direction facing the transmitter. Transmitter Y will only be charged when it receives a power pulse from antenna B on pump 2 (which will then be the only antenna receiving a response). Such a synchronized system provides better separation and higher confidence that the proper response is coming from the correct transmitter 23.

Thus synchronization of the system 10 is accomplished when the receiver/controllers 20 selectively send out power pulses so that all the antennas facing the same general direction (e.g. all antennas facing north, or facing south, or facing east, or facing west) send out a pulse at the same time, and all antennas facing different-directions do not send out pulses at that time. This synchronization is accomplished by the receiver/controllers 20 transmitting pulses from antennas facing one direction (e.g., antennas A) at a different time than the transmit/receive cycle of antennas facing a different direction (e.g., antennas B).

System Operation

Figure 9:
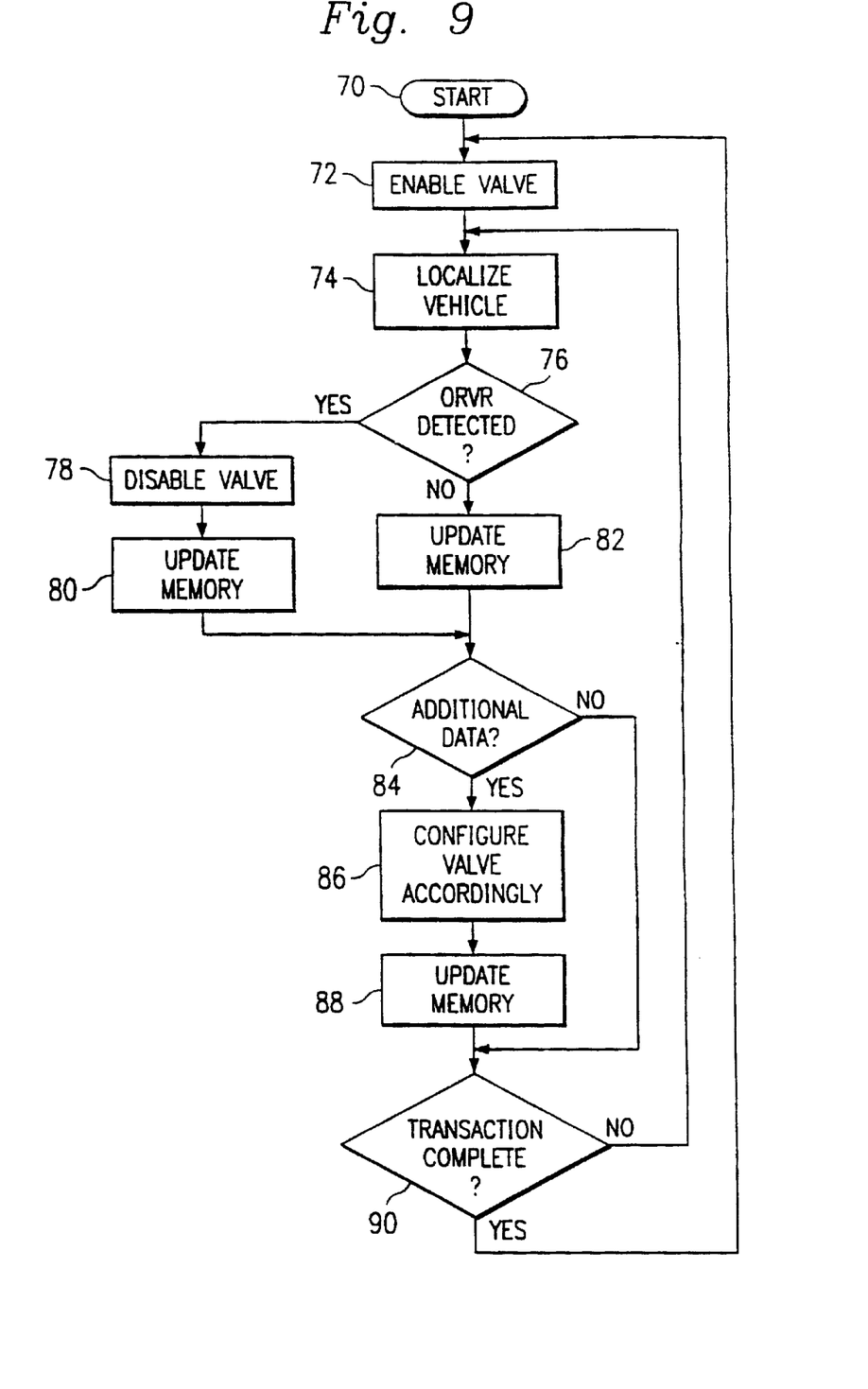
FIG. 9 is a flowchart illustrating the operation of the system of FIG. 1.

Referring to FIG. 9 in conjunction with all the previous FIGS. 1–8, a method 70 runs in each of the fuel dispensers 14. The method 70 is performed by the receiver/controller 20, although it is understood that different and/or separate components may perform one or more steps of the method.

At step 72, the CTRL signal 30 is enabled so that in response to fueling, the vapor pump 36 may turn on. The vapor recovery system 33 can then recover a quantity of vapor in proportion to the amount of fuel dispensed. At step 74, the receiver/controller 20 localizes the vehicle. In one embodiment, the receiver/controller 20 sends out a power pulse. This may be a periodic pulse, or in response to some type of customer input, such as a fuel type selection or a payment selection. In another embodiment, the receiver/controller 20 simply receives the unprompted ORVR-ID data from the transmitter 23, 25.

If a vehicle 26 with a transmitter 23, 25 is within range of antennas A and/or B, the transmitter will produce a logical "high" ORVR-ID data. Otherwise, no data pulse (logical "low" ORVR-ID data) is received. At step 76, the receiver/controller 20 receives the ORVR-ID data and determines whether or not an ORVR system is located before the corresponding dispenser 14. If so, execution proceeds to step 78 where the CTRL signal 30 is disabled (the vapor pump 36 is not able to turn on) and at step 80, the indicator 50 is updated to indicate that the vapor recovery system 33 is off. Otherwise, execution proceeds to step 82 and the indicator 50 is updated to indicate that the vapor recovery system 33 is on.

At step 84, the receiver/controller 20 determines if the transmitter 23, 25 has produced additional data. If so, execution proceeds to steps 86 and 88 where the receiver/controller 20 configures the vapor pump 36 and indicator 50 accordingly. For example, the additional data may indicate a type of fuel to be dispensed (minimum octane level, ethanol/no-ethanol, etc.). Upon completion of step 88, or upon a negative determination at step 84, execution proceeds to step 90 where the receiver/controller 20 determines if the transaction is complete. This can be determined, for example, by a manual or automatic shutoff of the corresponding nozzle 28. If the transaction is complete, execution returns to step 72, otherwise execution returns to step 74.

Although illustrative embodiments of the present invention have been shown and described, a latitude of modification, change and substitution is intended in the foregoing disclosure, and in certain instances, some features of the invention will be employed without a corresponding use of other features. For example, any type of commercially available dispensing system may be modified, adapted or replaced to comprise the system 10. Any number of pumps, islands, antennas, dispensing areas and kiosks may be included as part of the system. Many of the method steps and default configurations can be modified. Certain features are to be modified to meet the specific needs of different competing service station companies. Aspects of the operational flow of the system may optionally be used or not used. Accordingly, it is appropriate that the appended claims be construed broadly and in a manner consistent with the scope of the invention.

What is claimed is:

1. A dispensing method with radio frequency on-board vapor recovery (ORVR) identification capabilities for controlling a vapor recovery system during a dispensing operation, the method comprising:

providing a fuel dispenser;
   positioning a radio frequency receiver on the fuel dispenser;
   connecting a plurality of antennae to the receiver;
   transmitting, ORVR identification data from a plurality of transmitting sources near the antennae;
   at least two of the antennae determining whether the ORVR identification data has been received from at least one of the transmitting sources; and
   if the ORVR identification has been received, disabling the vapor recovery system during the dispensing operation.

2. The method of claim 1 wherein the determination of whether the ORVR identification data has been received occurs following initiation of dispensing.

3. The method of claim 1 further comprising:

if the ORVR identification data has not been received, enabling the vapor recovery system during dispensing.

4. The method of claim 1 wherein the receiver also emits a radio frequency signal within the dispenser range and transmission of the ORVR identification data is responsive to the emitted radio frequency signal being received by the transmitter.

* * * * *

UNITED STATES PATENT AND TRADEMARK OFFICE
CERTIFICATE OF CORRECTION

PATENT NO.    : 6,305,440 B1
DATED         : October 23, 2001
INVENTOR(S)   : Don C. McCall and Ken W. Taylor It is certified that error appears in the above-identified patent and that said Letters Patent is hereby corrected as shown below:

<u>Drawings,</u>
Figure 3, "reference numeral 28" should be replaced with -- 15 --

<u>Column 3,</u>
Line 34, replace "dispensers 12" with -- dispensers 14 --
Lines 66-67, "fuel tanks 31" should be replaced with -- fuels tanks --

<u>Column 4,</u>
Lines 5-6, replace "vapor recovery tank 36" with -- vapor pump 36 --

<u>Column 6,</u>
Line 38, replace "Once the data has been received data," with -- Once the data has been received, --

<u>Column 7,</u>
Line 30, replace the characters "$^{/A\lambda =A/}2\lambda$" with -- $/A\lambda = A/2\lambda$ --

Signed and Sealed this

Twenty-seventh Day of August, 2002

Attest:

Attesting Officer

JAMES E. ROGAN
Director of the United States Patent and Trademark Office